Patented Mar. 6, 1951

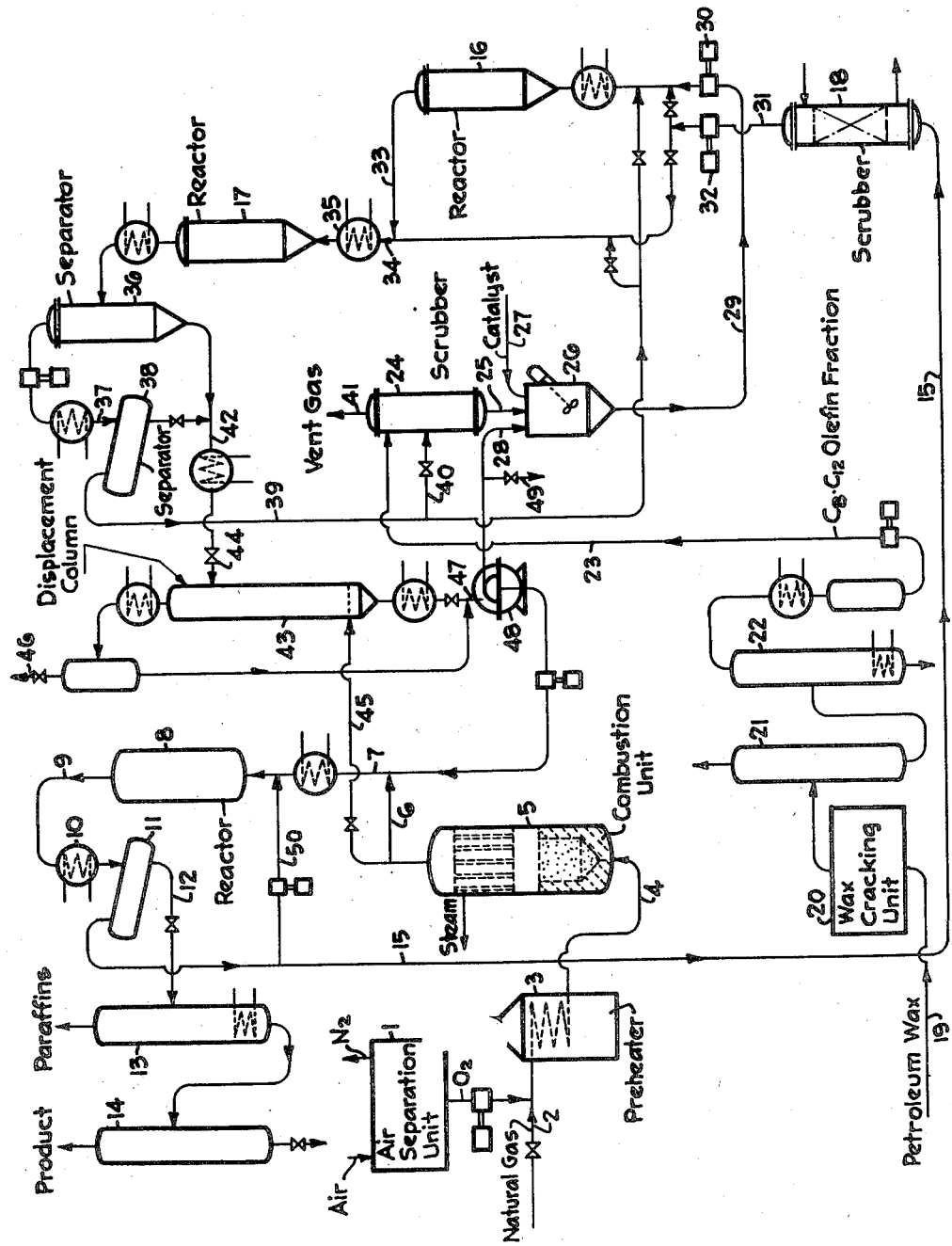

2,544,271

UNITED STATES PATENT OFFICE 2,544,271

PRODUCTION OF OXYGENATED PRODUCTS FROM PETROLEUM

George E. Liedholm, Berkeley, and James T. Harlan, Jr., San Rafael, Calif., assignors to Shell Development Company, San Francisco, Calif., a corporation of Delaware Application January 13, 1947, Serial No. 721,736

6 Claims. (Cl. 260—638)

This invention relates to the production of oxygenated products from petroleum and related products by a modification of the Oxo process.

The Oxo process provides a means for the synthesis of various oxygenated compounds through the addition of carbon monoxide and hydrogen to compounds containing an unsaturated carbon-to-carbon linkage. One of the more important applications of the Oxo process is in the production of carbinols by the addition of one molecule of carbon monoxide and two molecules of hydrogen to compounds containing an unsaturated carbon-to-carbon bond such, for instance, as an olefin. The addition reaction in this process may be indicated as follows:

(1) 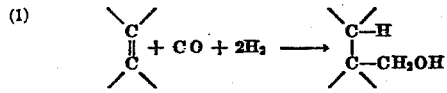

This reaction appears to take place in two steps, as follows:

(2) 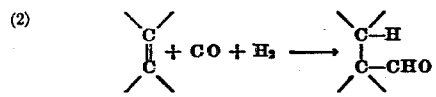

(3) 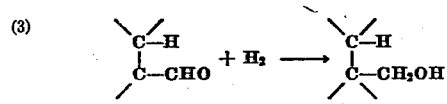

These reactions take place simultaneously and it is therefore not possible to effect a complete separation between them. However, the two reactions proceed most rapidly under somewhat different conditions. Consequently, it is the practice to effect the process in two stages corresponding roughly to the two above-indicated reactions. In the first stage, the olefin or other unsaturated compound is contacted with a synthesis gas containing hydrogen and carbon monoxide in approximately equal molecular proportions in the presence of a suitable catalyst, the excess unreacted gas is separated and recycled, and the partial reaction product containing hydrocarbons, aldehydes and carbinols is then contacted with hydrogen in the presence of the same catalyst in the second step. Further details will be found in "Petroleum Refiner," 25, 493–504 (1946), and the articles referred to therein.

Synthesis gas containing carbon monoxide and hydrogen in substantially equal molecular proportions is not however usually available for the first step of the process. While gas of this composition can be produced from coal, for instance, by the familiar water-gas reaction, the gas requires rather extensive purification. Furthermore, this method cannot usually compete economically in this country with other methods. It is most economical and practical to produce the synthesis gas from natural gas. This gas generally does not require any purification. However, it does not contain the carbon monoxide and hydrogen in the desired ratio. It is therefore necessary to treat the synthesis gas by one of the various known methods to adjust the carbon monoxide and hydrogen concentrations to the desired ratio.

It is an object of the present invention to provide an improved process wherein the synthesis gas requirements may be met in a less involved and more economical manner. In the present process a synthesis gas containing hydrogen and carbon monoxide in a molecular ratio of about 2:1 is used. This synthesis gas is preferably produced by the direct partial combustion of methane with oxygen according to the equation:

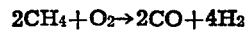

Partial combustion of natural gas with oxygen substantially in accordance with this equation can be carried out quite simply and cleanly at temperatures in the order of 2100° F. under high pressure. Since the natural gas is normally available under considerable pressure, it is generally only necessary to compress the oxygen to the combustion pressure. The synthesis gas under pressure then requires little or no further compression for use. Since the cost of compressing synthesis gas is normally a considerable proportion of the total operating cost, this method affords a substantial advantage. This advantage would be largely lost if it were necessary to extensively treat the synthesis gas to purify it or convert it into a synthesis gas containing the hydrogen and carbon monoxide in substantially equal molecular amounts.

In order to allow the above-described advantages to be fully realized and to afford certain additional advantages, the second step of the synthesis is carried out at a pressure materially lower than that used in the first step. Also the catalyst from the first step of the synthesis is removed prior to the second step and a different type of catalyst is used in its place. The synthesis gas is then supplied directly to the second step of the synthesis, rather than to the first step, in a sufficient amount, and the excess synthesis gas, now containing the hydrogen and carbon monoxide in a suitable ratio, is passed to the first synthesis step. While the synthesis is effected in two separate and distinct steps approximately in accordance with the postulated two reactions (2 and 3, above), the two steps constituting the synthesis are closely related, overlapping, and are not to be considered as an ordinary combination of separate processes. Thus, the two steps cannot be carried out at will at different times with good results but must be carried out as a single process. The product from the first step should pass to the second step continuously with no more than a matter of minutes between the steps. In order to obtain the best results, the product from the first synthesis step should be handled promptly and subjected to the second step of the synthesis in the shortest possible time.

The above-mentioned features as well as certain additional features are further described and explained in connection with the description of a typical operation. In this description reference will be had to the attached drawing wherein a plant adapted for operation in accordance with the process of the invention is illustrated diagrammatically by conventional figures not drawn to scale. The process is described in connection with the production of a product consisting substantially of primary alcohols having from about 9 to about 13 carbon atoms, starting with air, natural gas, and a petroleum fraction consisting largely of $C_8$–$C_{12}$ olefins, obtained by the cracking of petroleum wax.

Referring to the drawing, air is separated into nitrogen and oxygen in an air separation unit 1. Natural gas under pressure is supplied by line 2. The natural gas and oxygen are mixed in a ratio approximating that required for the reaction $$2CH_4 + O_2 \rightarrow 2CO + 4H_2$$

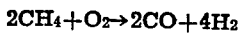

and the mixture is preheated up to about 800° F.–1000° F. by means of a preheater 3. The intimate mixture is then led by line 4 to the combustion unit 5 wherein the synthesis gas is produced substantially in accordance with the above equation. Combustion unit 5 has a heavy refractory lining in the bottom section. The combustion zone may be filled with granules of a refractory material, such, for instance, as zirconium oxide or silica. The temperature in the combustion zone is maintained at or about 2100° F. by the heat of reaction. The temperature may be regulated by control of the ratio of oxygen to natural gas in the feed. Usually about 5%–10% excess oxygen over the stoichiometric amount is required to maintain the desired temperature.

The pressure in the combustion zone is preferably substantially that desired in the second step of the process and may be, for example, 270 pounds per square inch. Since in the process of the invention the pressures employed in the second step of the process are materially lower than those required in the first step, the generation of the synthesis gas at the reaction pressure is feasible. The hot synthesis gas issuing from the combustion zone is partially cooled (producing steam which can be used to operate the air separation unit or to operate pumps, compressors, etc., in the process) and is then passed via lines 6 and 7 to reactor 8. This gas consists essentially of hydrogen and carbon monoxide in a ratio of at least 1.5:1 and usually about 2:1, and minor amounts of carbon dioxide, water vapor, methane and/or nitrogen.

The treated reaction product from the first step of the process consists essentially of aldehydes, alcohols and hydrocarbons having from 9 to 13 carbon atoms. However, minor amounts of both higher boiling and lower boiling products are usually present. This product is passed by line 7 to the reactor 8. Reactor 8 is provided with a suitable hydrogenation catalyst of the type which is operative in the presence of carbon monoxide. The metal catalysts such as nickel, cobalt, platinum, copper and the like are inoperative in the process in the presence of carbon monoxide and cannot be used. The hydrogenating compounds of these and certain other metals, on the other hand, are much more resistant to poisoning by carbon monoxide. Compounds of the class in question comprise the sulfides, selenides, tellurides, phosphites, halides, oxides, borates, chromites, molybdenates and tungstates. Suitable metals in addition to those mentioned are chromium, molybdenum, tungsten, rhenium, and zinc. In general, the various so-called sulf-active hydrogenation catalysts are resistant against poisoning by carbon monoxide.

The temperature in reactor 8 may be between about 100° C. and 350° C. The pressure may be between about 175 and 1000 pounds per square inch. The optimum conditions will vary in the known manner, depending upon the particular catalyst used. The residence time is limited according to the catalyst and conditions used so as not to convert more than a minor amount of the alcohol product to the corresponding hydrocarbon. This can easily be controlled in practice by simply maintaining the residence time sufficiently short so that inordinate amounts of water are not formed in the reaction product. (The water, derived from hydrogenation of oxygenated products to hydrocarbons, will separate as a separate phase in the product.) Since in the usual case it is not convenient to adjust the residence time during operation independent of the first synthesis step, an equivalent result is obtained by adjusting the temperature. Thus, if excess water appears in the product, the temperature is decreased. In general, the hydrogenation to the carbinol is complete. However, it is not necessarily so and, in such cases where the hydrogenation is not complete, the unreacted material may be separated in working up the product and either recovered as such or subjected to a second pass.

The reaction product and unused synthesis gas from reactor 8 are passed via line 9 and cooler 10 to separator 11. The liquid reaction product withdrawn via line 12 may be utilized as is, or it may be worked up in any desired manner to separate or concentrate one or more products. Thus, the reaction product may be passed to a fractionator 13 wherein paraffins may be removed. These paraffins are not produced by synthesis but are produced primarily by the hydrogenation of a portion of the olefins in the feed in the first synthesis step and sometimes also by a minor amount of excessive hydrogenation in the second synthesis step. The bottom product from the fractionator 13 may then be further fractionated in fractionator 14 to separate a product consisting essentially of $C_9H_{13}$ alcohols from higher boiling reaction products.

The excess synthesis gas separated from the reaction product in separator 11 is utilized in the first step of the process. A portion may be recycled to reactor 8 via line 50. In this step a synthesis gas containing hydrogen and carbon monoxide in a mole ratio between about 1:1 and 1.5:1 is desired. Since the reaction in reactor 8 consumes mainly hydrogen, the residual gas from the reactor contains the desired ratio of hydrogen to carbon monoxide. This ratio may be controlled within the desired limits by regulating the amount of synthesis gas introduced into reactor 8 via line 7. The amount of synthesis gas introduced into reactor 8 may be, for example, such that between about 20% and 35% of the synthesis gas is reacted, the remainder being removed via line 15. Thus, the excess synthesis gas from separator 11 is passed to reactors 16 and 17, wherein the first step of the process is carried out. When a metal sulfide catalyst is employed in reactor 8, it is usually desirable to pass the synthesis gas from separator 11 through a scrubber 18 to remove traces of hydrogen sulfide.

The feed to the first step of the process comprises the described synthesis gas from the second step of the process and a hydrocarbon fraction consisting largely of $C_8$–$C_{12}$ olefins. This fraction is obtained from the cracking of petroleum wax. This source of olefins is particularly suitable since the olefins produced by cracking petroleum wax are largely straight chain olefins. Thus, a petroleum wax entering via line 19 is passed to a cracking unit 20 wherein it is cracked by one of the conventional methods. Thermal cracking methods are quite suitable. If catalytic cracking is resorted to, it is preferred to use an activated carbon as catalyst. The products of the cracking of the wax are subjected to a suitable treatment to recover a fraction of the desired olefins, in this case those having from 8 to 12 carbon atoms. Thus, the lower boiling products may be separated as an overhead product from fractionator 21 and the desired fraction may be separated from heavier products by fractionator 22.

In the particular embodiment of the invention illustrated, the $C_8$–$C_{12}$ fraction of cracked wax olefins is utilized to scrub vent gas and then to serve as a transport medium for introducing the catalyst into reactors 16 and 17. Thus, the olefin fraction is passed via line 23 to a scrubber 24 and then via line 25 to mixing tank 26. In mixing tank 26, the olefin fraction is slurried with the catalyst for the first step of the process. Fresh catalyst is added as needed via line 27. However, the bulk of the catalyst is recycled catalyst separated, as will hereinafter be described, and introduced via line 28. The preferred catalyst is cobalt preferably promoted by a minor amount of thorium oxide and supported upon a support such as kieselguhr. However, any of the various known catalysts for the addition of carbon monoxide to unsaturated compounds may be used. Such catalysts will hereinafter be referred to as Oxo synthesis catalysts. The catalysts do not necessarily have to be promoted or supported. Thus, compounds of metals which are converted in part to the metal carbonyl under the reaction conditions may be employed. Examples of such compounds are the metal salts of organic acids. While it is not essential it is preferred when employing such compounds to employ one which is appreciably soluble in the liquid feed to the process, as, for instance, cobalt caprylate.

The olefinic hydrocarbon fraction containing the catalyst is passed via line 29 and pump 30 to reactor 16. Synthesis gas, produced as previously described, is introduced into the feed stream via line 31. The reactor 16 may advantageously contain a bed of catalyst as, for example, cobalt metal turnings or cobalt deposited upon pumice or kieselguhr. However, it is not necessary to provide such a catalyst bed and in the particular operation being described no such bed is used.

The conditions in reactor 16 are adjusted and maintained in the known manner to afford substantial synthesis predominantly according to reaction (2) above. The reaction temperature is usually between about 80° C. and 200° C., for example, 150° C. The pressure may range from about 20 atmospheres up to several hundred atmospheres. A pressure of about 130 atmospheres is usually used, and this is the pressure in the particular example being illustrated. This pressure is considerably higher than that used in the second step of the synthesis previously described. Since it is also considerably higher than the pressure under which the synthesis gas is produced, the synthesis gas for the first step of the synthesis is further compressed. Compressor 32 is provided for this purpose. It will be noted, however, that only approximately two-thirds of the synthesis gas requires this compression.

The reaction in the first step of the synthesis may be carried out with the reactants in the vapor phase. However, under the conditions of this example the reaction is carried out in the presence of a substantial liquid phase. The liquid reaction mixture contains catalyst in suspension (either added as such or produced in the reaction zone by decomposition of the mentioned soluble metal compound). In the case described, the amount of suspended catalyst is between about 1% and 4% based on the liquid phase. The residence time (calculated average) of the liquid in the reactor may vary, depending upon the temperature, pressure and activity of the catalyst, but is usually in the order of 10 to 40 minutes. The reaction is exothermic and some cooling is usually necessary. This may be accomplished in any one of a number of obvious ways. Consequently, in the interest of simplicity it has not been shown in the drawing. Suitable methods are, for example, by the use of internal cooling coils, by precooling the feed materials, or by vaporization of a liquid coolant supplied to the reaction zone.

For the purpose of obtaining a more complete reaction, the reaction mixture from reactor 16 is preferably, but not necessarily, passed to a second stage reactor operated at a somewhat higher temperature (for instance, 30° C. higher) than in the first reactor 16. Thus, in the modification being described, the reaction product from reactor 16 is passed via lines 33 and 34 to reactor 17. The necessary heat to establish the desired temperature may be supplied by heat exchanger 35. Additional synthesis gas approximately equivalent in amount to the amount consumed in reactor 16 may be introduced via line 34.

The reaction mixture from reactor 17 is cooled somewhat and passed to a high pressure separator 36. The vapor fraction is then further cooled and passed by line 37 to a separator 38, wherein a minor amount of condensate is collected. The residual gas may be scrubbed or recycled directly to the first synthesis step via line 39. This recycle gas may be fed either to reactor 16 or reactor 17 or to both reactors. A part of this gas is also preferably withdrawn from the system, to prevent the accumulation of undesirable concentrations of diluent materials such as methane, nitrogen, etc. Thus, a portion is withdrawn via line 40 and passed to scrubber 24 wherein it is scrubbed by the olefinic feed to recover product values. The vent gas is then withdrawn via line 41.

The liquid product from separator 36 contains catalyst in suspension and also contains dissolved metal carbonyl, in this case cobalt carbonyl. For example, it may contain about 0.5 gram of cobalt as cobalt carbonyl per liter. This product, as well as the minor amount of condensate from separator 38, is passed via line 42 to displacement column 43 wherein the metal carbonyl is decomposed into the metal and carbon monoxide. This decomposition is effected by maintaining the temperature above the decomposition temperature of the metal carbonyl by any known means and reducing the partial pressure of carbon monoxide. This latter reduction is preferably effected by reduction of the total pressure as well as the displacement action of a gas such as nitrogen, carbon dioxide, or a gaseous hydrocarbon. Thus, in the embodiment illustrated, the pressure is reduced at valve 44 and a portion of the hydrogen-rich synthesis gas withdrawn via line 45 is bubbled up through the liquid reaction mixture. The exit gas may be cooled to condense minor amounts of product values and may then be withdrawn via line 46. When synthesis gas is used as the displacement gas, as illustrated, the gas from line 46 may, if desired, be re-used as synthesis gas. The liquid product, containing suspended catalyst, is withdrawn from the displacement column by line 47 and passed to a filter 48. The catalyst is passed to the mixing tank 26 as previously described. A portion of the catalyst may be withdrawn via line 49. The liquid reaction product from the first step of the synthesis is then passed to the second step of the synthesis via line 7 as previously described.

In the above, the process of the invention has been described in connection with the production of $C_8$-$C_{13}$ alcohols from air, natural gas, and a $C_8$-$C_{12}$ olefin fraction obtained by the cracking of petroleum wax. The process of the invention is however not limited to this application. The process is of general application in the production of carbinols having from 3 to about 20 carbon atoms. For this purpose, various single olefins as well as various mixtures of olefins or olefinic hydrocarbon fractions or extracts may be used. The olefin or olefins may be primary, secondary or tertiary. The olefinic feed may contain small amounts of sulfur compounds, nitrogen compounds or other normal impurities; however, such impurities are preferably kept at a minimum. Also, inert diluent materials such as aromatic or saturated hydrocarbons, alcohols, ketones, organic acids, ethers and steam may be present. Suitable sources of olefins are, for example, the various olefin polymer fractions obtained by the polymerization of lower olefins.

While the process has been described in connection with the production of open chain monohydric alcohols, it is also applicable for the production of carbinols having aromatic and cycloparaffin groups as by the application of such olefinic materials as cyclohexene, cyclopentene, cyclohexylethylene, styrene, and the like. Also, it may be employed in the production of polyhydric carbinols from materials containing two or more ethylenic bonds such as butadiene, the methyl butadienes, cyclohexadiene and the like. Hydrocarbons having one or more acetylenic linkages may also be employed.

While unsaturated hydrocarbons are by far the cheapest raw materials and are of primary interest at present, the process is not limited to the use of these materials. Thus, various oxygenated compounds containing an unsaturated bond, such as unsaturated aldehydes, ketones, acids, esters, alcohols and ethers may be employed. Carbon monoxide and hydrogen are known to add to the unsaturated bond in such compounds in a similar manner. Thus, from an unsaturated aldehyde or alcohol a saturated dihydric alcohol is produced, and from unsaturated ketones, acids, esters and ethers the corresponding carbinol addition products are formed.

The basic principle of the invention as well as numerous details has been described above. In a process involving as many operations as the particular operation described, there are obviously numerous small details which could be described. However, these details are not part of the invention, and since the art in which the present invention is an improvement is fairly well developed, it is preferred in the interest of simplicity to refer to the prior art for further details of such matters. Thus, for example, various catalysts and conditions which are applicable for the hydrogenation of the aldehydic reaction product in the second step of the process are known; the various catalysts and conditions which are applicable in the first step of the process are known; various unsaturated compounds suitable as feed materials for the process are known; a variety of applicable reactor designs and process wrinkles are known.

The invention claimed is:

1. A process for the production of oxygenated products including alcohol from an olefinic petroleum fraction, natural gas, and oxygen through the two-step Oxo synthesis, which comprises the steps of combusting natural gas with oxygen under conditions to produce a synthesis gas consisting predominantly of hydrogen and carbon monoxide in a mol ratio of at least 1.5:1, reacting said olefinic petroleum fraction in the first step of the Oxo synthesis with a cobalt catalyst and with a synthesis gas derived as hereinafter specified and consisting predominantly of hydrogen and carbon monoxide in a mol ratio below 1.5:1 to produce a liquid product containing aldehydes, hydrogenating said liquid product in the second step of the Oxo synthesis in a separate zone with a sulf-active hydrogenation catalyst and with said synthesis gas consisting predominantly of hydrogen and carbon monoxide in a mol ratio of at least 1.5:1, said synthesis gas being applied in an amount in excess of the amount consumed in said hydrogenation, and utilizing the unreacted excess synthesis gas from said hydrogenation step as the aforementioned synthesis gas reacted with said olefinic petroleum fraction in said first synthesis step, and recovering oxygenated product including alcohol from the product of said second synthesis step.

2. In a process for the production of an oxygenated product by the catalyzed addition of carbon monoxide and hydrogen to an unsaturated compound through the two-step Oxo synthesis, the improvement which comprises effecting the second step of said synthesis with a sulf-active hydrogenation catalyst at a pressure materially below that employed in the first step of said synthesis, supplying synthesis gas having a ratio of hydrogen to carbon monoxide of at least 1.5:1 in the second step of the synthesis in an amount such that the ratio of hydrogen to carbon monoxide in the unreacted excess gas from said second synthesis step is less than 1.5:1, compressing said excess unreacted gas and utilizing the same as the synthesis gas in the first step of the synthesis with a cobalt catalyst.

3. In the production of an oxygenated product consisting largely of alcohol by the catalyzed addition of one mol part of carbon monoxide and two mol parts of hydrogen to one mol part of unsaturated hydrocarbon through the two-step Oxo synthesis the improvement which comprises effecting the second step of said synthesis with a sulf-active hydrogenation catalyst at a pressure materially below that employed in the first step of said synthesis, supplying synthesis gas having a ratio of hydrogen to carbon monoxide of at least 1.5:1 in the second step of the synthesis in an amount such that the ratio of hydrogen to carbon monoxide in the unreacted excess gas from said second synthesis step is less than 1.5:1, compressing said excess unreacted gas and utilizing the same as the synthesis gas in the first step of the synthesis with a cobalt catalyst.

4. In a process for the production of oxygenated products from an olefinic petroleum fraction, natural gas, and oxygen through the catalyzed addition of carbon monoxide and hydrogen to olefins through the two-step Oxo synthesis, the improvement which comprises combusting natural gas with oxygen under a pressure substantially equivalent to that employed in the second synthesis step of said process to produce a synthesis gas consisting predominantly of hydrogen and carbon monoxide in a mol ratio of at least 1.5 to 1, supplying said synthesis gas to the second synthesis step of said process using a sulf-active hydrogenation catalyst wherein hydrogen is reacted at a faster rate than carbon monoxide while limiting the amount of said synthesis gas supplied such that the excess unreacted gas contains hydrogen and carbon monoxide in a mol ratio less than 1.5 to 1, and utilizing said last mentioned excess gas from the second synthesis step as the synthesis gas supplied to the first synthesis step of said process wherein a cobalt catalyst is used.

5. In a process for the production of a carbinol by the catalyzed addition of carbon monoxide and hydrogen to an unsaturated compound through the two-step Oxo synthesis, the improvement which comprises effecting the second synthesis step of said process with a sulf-active hydrogenation catalyst, supplying as synthesis gas to said second synthesis step of said process a synthesis gas having a ratio of hydrogen to carbon monoxide of at least 1.5:1, said synthesis gas being supplied to said second synthesis step in such an amount that the ratio of hydrogen to carbon monoxide in the excess unreacted gas from said second synthesis step is less than 1.5:1, and utilizing said excess unreacted gas from said second synthesis step as the synthesis gas supplied to the first synthesis step of said process wherein a cobalt catalyst is used.

6. In a process for the production of an alcohol by the catalyzed addition of one mol part of carbon monoxide and two mol parts of hydrogen to one mol part of an olefin through the two-step Oxo synthesis, the improvement which comprises supplying as synthesis gas for the process a synthesis gas containing hydrogen and carbon monoxide in a mol ratio of about 2:1, feeding the total supply of said synthesis gas to the second synthesis step of said process in an amount slightly in excess of the total amount of synthesis gas reacted in the two synthesis steps of said process and utilizing the unreacted excess synthesis gas enriched in carbon monoxide from said second synthesis step as the synthesis gas feed to the first synthesis step of said process, the catalyst in the said first synthesis step being a cobalt catalyst and that in said second synthesis step being a sulf-active hydrogenation catalyst.

GEORGE E. LIEDHOLM.
JAMES T. HARLAN, Jr.

REFERENCES CITED

The following references are of record in the file of this patent:

UNITED STATES PATENTS

| Number | Name | Date |
|---|---|---|
| 2,178,824 | Atwell | Nov. 7, 1939 |
| 2,264,427 | Asbury | Dec. 2, 1941 |
| 2,327,066 | Roelen | Aug. 17, 1943 |
| 2,402,133 | Gresham et al. | June 18, 1946 |
| 2,417,164 | Huber | Mar. 11, 1947 |